(12) United States Patent
Zhang (10) Patent No.: US 10,097,962 B2
(45) Date of Patent: Oct. 9, 2018

(54) SYSTEM AND METHOD FOR VIRTUAL USER-SPECIFIC CONNECTIVITY MANAGEMENT

(71) Applicant: Huawei Technologies Co., Ltd., Shenzhen (CN)

(72) Inventor: Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 643 days.

(21) Appl. No.: 14/192,573

(22) Filed: Feb. 27, 2014

(65) Prior Publication Data

US 2015/0072705 A1 Mar. 12, 2015

Related U.S. Application Data

(60) Provisional application No. 61/877,143, filed on Sep. 12, 2013.

(51) Int. Cl.
*H04W 4/029* (2018.01)
*H04W 4/02* (2018.01)

(52) U.S. Cl.
CPC .......... *H04W 4/029* (2018.02); *H04W 4/025* (2013.01)

(58) Field of Classification Search
CPC .......... H04W 4/02; H04W 4/06; H04W 4/12; H04W 60/04; H04W 64/00; H04W 68/00; H04W 4/028; H04W 4/021; H04W 4/025; H04W 4/0259
USPC ............ 455/404.2, 414.1, 432.3, 436, 456.1, 455/456.2, 456.3, 456.4, 456.5
See application file for complete search history.

(56) References Cited

U.S. PATENT DOCUMENTS

| | | | | |
|---|---|---|---|---|
| 7,978,691 B1 * | 7/2011 | Cole | ...................... | H04W 40/24 370/252 |
| 8,095,172 B1 * | 1/2012 | Cole | ...................... | H04W 48/18 370/254 |
| 8,391,897 B1 * | 3/2013 | Oroskar | ................ | H04W 68/08 455/343.1 |
| 8,909,191 B2 * | 12/2014 | Pipes | ...................... | H04W 4/02 455/404.1 |
| 9,426,613 B2 * | 8/2016 | Alizadeh-Shabdiz | .... | G01S 5/02 |
| 9,521,511 B2 * | 12/2016 | Uga | ...................... | H04W 64/00 |
| 2002/0183071 A1 | 12/2002 | Shioda et al. | | |

(Continued)

FOREIGN PATENT DOCUMENTS

CN 1388715 A 1/2003
CN 1977563 A 6/2007

(Continued)

OTHER PUBLICATIONS

Huawei Technologies, Co., Ltd., International Application No. PCT/CN2014/086201, Search Report & Written Opinion, dated Dec. 11, 2014, 12 pages.

*Primary Examiner* — Jean Gelin
(74) *Attorney, Agent, or Firm* — Slater Matsil, LLP (57) ABSTRACT

A method embodiment includes configuring, by a virtual user-specific connectivity manager (v-u-CM) on a processor, a location estimation scheme for a user equipment (UE) in accordance with UE configuration. The v-u-CM is created in accordance with registration of the UE in the network. The method further includes tracking, a location of the UE in accordance with the location estimation scheme.

39 Claims, 7 Drawing Sheets

(56) References Cited

U.S. PATENT DOCUMENTS

| | | | |
|---|---|---|---|
| 2005/0288033 A1* | 12/2005 | McNew | G01S 5/021 455/456.1 |
| 2006/0121914 A1* | 6/2006 | Kim | H04W 36/14 455/456.1 |
| 2007/0087761 A1* | 4/2007 | Anjum | H04W 64/00 455/456.2 |
| 2007/0178913 A1* | 8/2007 | Niemenmaa | H04W 64/00 455/456.4 |
| 2007/0243869 A1 | 10/2007 | Kwon et al. | |
| 2011/0053594 A1 | 3/2011 | Lim et al. | |
| 2011/0269477 A1* | 11/2011 | Annamalai | H04W 64/00 455/456.1 |
| 2011/0294534 A1* | 12/2011 | Gunder | H04W 60/00 455/524 |
| 2012/0302263 A1* | 11/2012 | Tinnakornsrisuphap | H04W 64/00 455/456.6 |
| 2013/0091452 A1* | 4/2013 | Sorden | G06F 3/048 715/771 |
| 2015/0055560 A1* | 2/2015 | Efrati | H04L 65/1073 370/328 |
| 2015/0072705 A1* | 3/2015 | Zhang | H04W 4/028 455/456.1 |

FOREIGN PATENT DOCUMENTS

| | | |
|---|---|---|
| CN | 102170626 A | 8/2011 |
| CN | 102223597 A | 10/2011 |
| CN | 102970672 A | 3/2013 |

\* cited by examiner

SYSTEM AND METHOD FOR VIRTUAL USER-SPECIFIC CONNECTIVITY MANAGEMENT

This application claims the benefit of U.S. Provisional Application No. 61/877,143, filed on Sep. 12, 2013, entitled "System and Method for Virtual User-Specific/Dedicated Connectivity Management," which application is hereby incorporated herein by reference.

TECHNICAL FIELD

The present invention relates to a system and method for wireless communications, and, in particular embodiments, to systems and methods for virtual user-specific connectivity management.

BACKGROUND

Current network architectures apply a one-size fit-all approach with respect to packet data network gateways (PGW), service gateways (SGW), base stations (BS), mobility management entities (MME), and the like. In current networks, a fixed-location MME may be selected for each UE by a network radio node (e.g., a base station) that serves the UE upon the UE's entry into the network. The selection of the MME is typically also based solely on geography. The MME may then in turn select the SGW for the UE. Traditional networks include MMEs and SGWs that are fixed in location and lack flexibility for adapting to dynamic radio access network (RAN) topology changes. Further traditional MMEs cannot provide mobility management in a customized manner to each individual UE and its service flow.

SUMMARY

These and other problems are generally solved or circumvented, and technical advantages are generally achieved, by preferred embodiments of the present invention which provides a system and method for virtual user-specific connectivity management.

In accordance with an embodiment, a method includes configuring, by a virtual user-specific connectivity manager (v-u-CM) on a processor, a location estimation scheme for a user equipment (UE) in accordance with UE configuration. The v-u-CM is created in accordance with registration of the UE in the network. The method further includes tracking, a location of the UE in accordance with the location estimation scheme.

In accordance with another embodiment, a network entity includes a processor and a computer readable storage medium storing programming for execution by the processor. The programming includes instructions to create a virtual user-specific connectivity manager (v-u-CM) in accordance with registration of a user equipment (UE) in a network and operate the v-u-CM. The instructions to operate the v-u-CM include further instructions to configure a location estimation scheme for the UE in accordance with UE configuration and track a location of the UE in accordance with the location estimation scheme.

In accordance with another embodiment, a method includes registering, by a first network CM, a UE in a network, and triggering creation of a virtual user-specific connectivity manager (v-u-CM) and a virtual user-specific service gateway (v-u-SGW) for the UE in accordance with registration of the UE. The v-u-CM is configured to track a location of the UE.

In accordance with yet another embodiment, a network controller includes a processor and a computer readable storage medium storing programming for execution by the processor. The programming includes instructions to register a UE in a network and trigger creation of a virtual user-specific connectivity manager (v-u-CM) and a virtual user-specific service gateway (v-u-SGW) for the UE in accordance with registration of the UE. The v-u-CM is configured to track a location of the UE.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments provide virtual user-specific connectivity managers (v-u-CM, sometimes referred to as virtual user-specific mobility managers) and virtual user-specific service gateways (v-u-SGW) for user equipment (UEs) in a network. The v-u-CM and v-u-SGW are virtual software entities that may be specific to a particular UE or group of UEs. For example, each v-u-CM and v-u-SGW may be created upon registration of a UE in the network and dynamically relocated as the UE moves in the network. Similarly, the v-u-CM/v-u-SGW may be removed from the network when the UE deregisters from the network (e.g., at power off). Each v-u-SGW may provide application layer, layer 3, layer 2, and/or layer 1 anchor point functionality for served UE(s) based on UE and/or network configuration. The v-u-CM may configure location estimation schemes on the UE, track the UE's location information for the network control plane, trigger the adaptation of UE-specific data plane architecture (e.g., triggering creation of backhaul/access links), update higher-level CM (e.g., regional or national CMs) of UE location, estimate UE location, and the like. Higher-level CMs (e.g., regional or national CMs) may track UE location and manage the location of an associated v-u-CM/v-u-SGW accordingly. Thus, various embodiments provide mechanisms to enable a customized data plane network topology and data processes that is UE-specific and dynamically configurable.

Figure 1A:
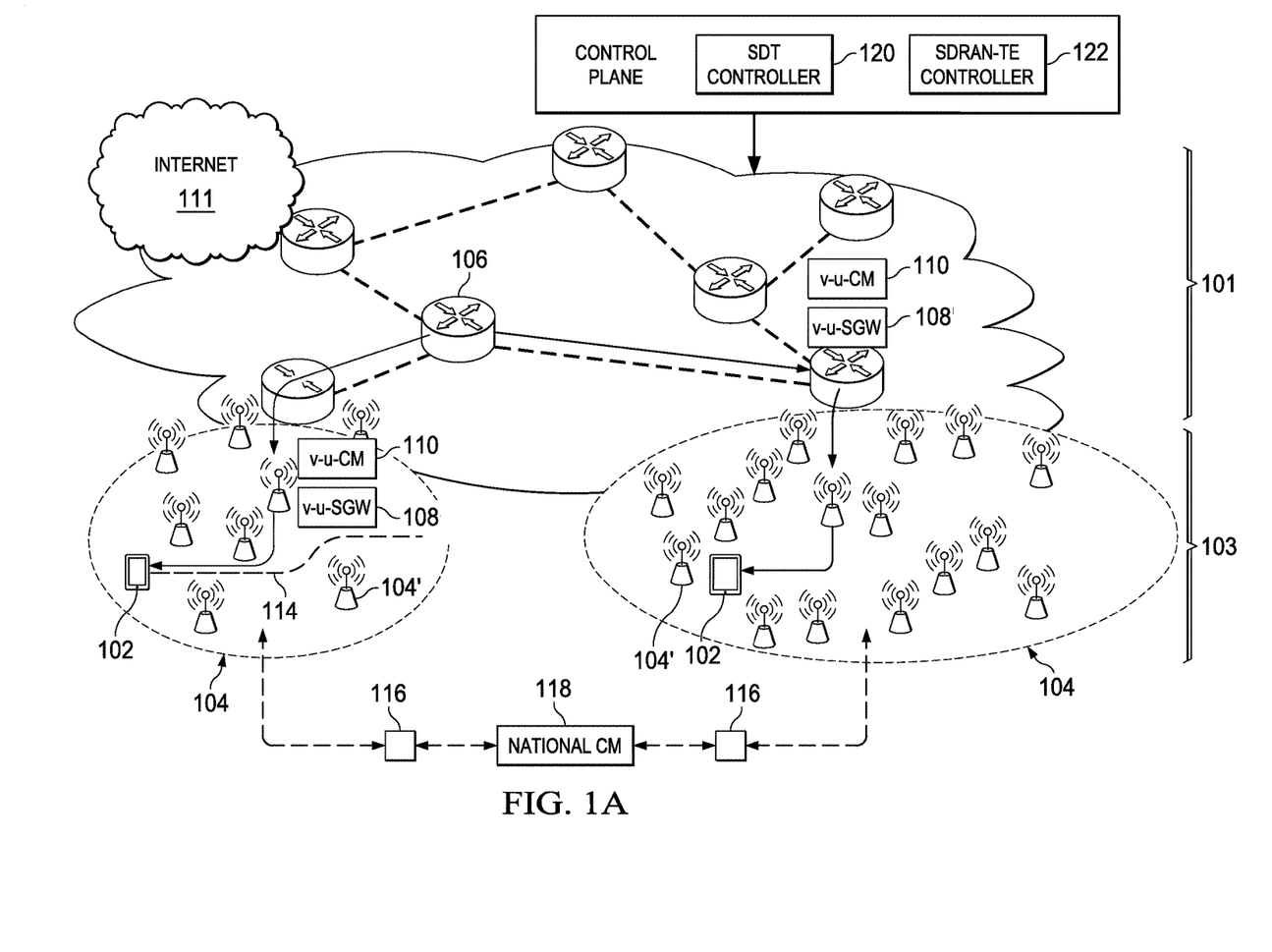
FIGS. 1A and 1B illustrate block diagrams of portions of a network 100 having virtual user-specific connectivity managers in accordance with various embodiments.

FIG. 1A illustrates a network 100 having v-u-CMs 110 and v-u-SGWs 108 in accordance with various embodiments. Network 100 includes user equipment (UEs) 102 and a plurality of geographical regions 104 (e.g., CRAN clusters), which may include a plurality of densely-deployed operator network nodes 104'. For example, in network 100, there may be a hundred or more low power network nodes per $km^2$ in each geographical region 104. Network nodes in geographical regions 104 may be access networks (ANs) such as long term evolution (LTE) base stations (BS), universal mobile telecommunication system (UMTS) nodeBs/radio network controllers (RNCs), WiFi access points (APs), future ANs, combinations thereof, and the like, which provide access link functionality for end-user terminals, such as UEs 102. Furthermore, the network nodes in geographical regions 104 may support communications in accordance with various communications standards such as code divisional multiple access (CDMA), LTE, Global Systems for Mobile Communications (GSM), Universal Mobile Telecommunications System (UMTS), future communications standards, combinations thereof, and the like. Each radio node may or may not be capable of communicating in accordance with more than one standard.

Network nodes in geographical regions 104 may be adapted to provide access links to specific UEs 102, for example, based on geography, received channel conditions, and the like of a UE 102. In network 100, data flow packets may be transmitted from a transmission source 111 (e.g., a UE, a datacenter, or the like) to a virtual user-specific SGW (v-u-SGW) 108 serving the destination UE 102. The v-u-SGW 108 processes the packet as desired, for example, providing application layer, layer 3, layer 2, and/or layer 1 functionality. The v-u-SGW 108 of a destination UE 102 may then forward the processed packet to the destination UE 102. Uplink transmissions from UE 102 to the network may be conducted in a similar manner in reverse. Thus, v-u-SGWs 108 may operate as mobility and data plane anchor points for UEs 102. That is, network traffic for each UEs 102 may first pass through its corresponding v-u-SGW 108 before being forwarded to the destination UE 102 (in downlink) or the packet's destination (in uplink).

The inclusion of v-u-SGWs 108 allows the network to be logically divided into at least two domains from UE 102's perspective: core network domain 101 and local network domain 103. A virtual core network domain 101 includes network resources (e.g., network SGWs 106 and/or network nodes 104') that may be used to transmit data packets between the network (e.g., network SGWs 106 and/or other network entities) and a v-u-SGW 108 of UE 102. Local network domain 103 includes network resources (e.g., network nodes 104') that may be used to transmit data packets between a v-u-SGW 108 and a served UE 102. For example, local network domain 103 may include the set of network nodes geographically located within a certain range of UE 102 that may is available for transmissions to/from UE 102.

Resource management in network 100 may include allocating network resources in both the core network domain 101 (e.g., between network SGW 106 and v-u-SGW 108) and local network domain 103 (e.g., between v-u-SGW 108 and UE 102). The set of allocated resources (e.g., access links, backhaul links, and the like) for a particular service (e.g., transmissions between a UE and one or more other network devices) may be referred to as a virtual network. Forwarding paths (e.g., from a virtual network perspective) may be divided into multiple segments. For example, transmissions in network 100 may be divided into at least two forwarding segments. A first forwarding segment includes virtual network links (e.g., backhaul links) for transmitting a packet to/from the network (e.g., network SGW 106 and/or other network entities) and a v-u-SGW 108 in core network domain 101. A second forwarding segment includes virtual network links (e.g., backhaul/access links) for transmitting a packet to/from the v-u-SGW 108 and a destination UE 102 in local network domain 103 (e.g., through one or more network 104'). The configuration of specific forwarding paths for UEs 102 in network 100 may be performed by a software defined radio access network traffic-engineering (SDRAN-TE) controller 122, which may configure forwarding information bases (FIBs) of v-u-SGWs.

Each v-u-SGW 108 is a software entity, which may be created upon registration of a UE 102 in network 100. Thus, each v-u-SGW 108 may be user-specific and correspond to a single UE 102. Alternatively, a v-u-SGW 108 may correspond to a group of UEs. For example, a v-u-SGW 108 may correspond to a group of UEs a group of UEs on a bus, a group of UEs/or other communication equipment in a particular area, or the like. v-u-SGWs 108 may be physically located at a radio node or other network device in geographical regions 104. From a network point of view, v-u-SGW 108 may be treated as a virtual UE or similar virtual device. From an associated UE 102 (or group of UEs 102)'s point of view, v-u-SGW 108 is a default service gateway that provides configurable functions, such as application layer functions, layer 3, layer 2, and/or layer 1 functionality and anchoring. As UE 102's location changes, the physical location of v-u-SGW 108 and/or the configuration of forwarding paths (e.g., forwarding segments in core network domain 101 and/or local network domain 103) may be updated accordingly.

To enable this dynamic configuration of forwarding paths and v-u-SGWs 108, the network may dynamically track UE locations. A corresponding v-u-CM 110 may also be created at user registration for each v-u-SGW 108 in network 100. v-u-CMs 110 are software entities that may be co-located at the same physical location as a corresponding v-u-SGW 108. Alternatively, v-u-CMs 110 and corresponding v-u-SGWs 108 may be located in different physical locations. Each v-u-CM 110 may configure UE location estimation schemes, track the location of a served UE 102 (or served group of UEs), and/or trigger network data plane reconfiguration accordingly.

In various embodiments, a v-u-CM 110 may configure UE location estimation schemes for a served UE 102 (or group of UEs), for example, based on network configuration and/or UE configuration. For example, in network 100, multiple different procedures may be used to track UE location, such as using downlink channel strength measurements, uplink channel strength measurements, synchronized prediction algorithms, or the like. An example procedure for estimating UE location based on downlink channel measurements may include network nodes 104' broadcasting pilot signals (or similar reference signal), which may be detected by UE 102.

Based on the strength of various received pilot signals, UE 102's location may be estimated relative to network nodes 104'. UE 102 may report received signal strengths to v-u-CM 110 or another network entity for location estimation.

An example procedure for estimating UE location based on uplink channel measurements may include a UE 102 broadcasting a pilot signal (or similar reference signal), which may be detected by/monitored by a set of network nodes 104'. Network nodes 104' may then estimate UE 102's location based on the strength of UE 102's pilot signal at each network node 104'. In other embodiments, UE 102 (or an associated radio node 104') may simply signal its location to v-u-CM 110.

An example procedure for estimating UE location based on synchronized prediction algorithms may include UE 102 and v-u-CM 110 performing a same prediction algorithm without relying on channel measurements. For example, v-u-CM 110 may estimate UE 102's location by applying a predication algorithm to known, previous locations of UE 102. UE 102 may also estimate UE 102's location applying the same prediction algorithm as v-u-CM 110 using the same data. If a difference (or a difference above a threshold) is detected between UE 102's actual location (e.g., provided by a global positioning system (GPS)) and the estimated location, UE 102 may signal v-u-CM 110 with the actual location (e.g., in an error report). Absent a contrary signal, v-u-CM 110 may assume the estimated location is accurate at least within a configurable threshold. Thus, v-u-CM 110 may determine UE 102's location without relying on constant signaling or channel measurements. Signaling may be limited to cases where the estimated location is inaccurate.

v-u-CM 110 may select a location estimation scheme for the served UE 102, for example, based on network configuration (e.g., network topology such as whether network is a densely deployed network, energy saving considerations for network nodes, and the like) and/or UE 102's configuration (e.g., neighborhood relations of UE 102, UE 102's capabilities, UE 102's mobility setting/environment, energy, and the like). Relevant UE 102 capabilities may include UE 102's ability to run positioning systems, such as, a global positioning system (GPS). For example, when UE 102 is located near a multiple, densely-deployed network nodes 104', it may be costly or impractical for the UE to take downlink channel estimates from nearby network nodes. In such embodiments, v-u-CM 110 may select an alternative location estimation scheme (e.g., based on uplink channel measurements) than one based on downlink channel measurements. As another example, if UE 102 is surrounded by macro-network nodes (e.g., macro-base stations), v-u-CM 110 may select a location estimation scheme based on downlink channel measurements. As another example, location estimation using synchronized prediction algorithms may require UE 102 to have certain functionalities (e.g., GPS location tracking). If UE 102 does that have the requisite functions, a different location estimation scheme may be selected. As yet another example, if location estimation using synchronized prediction algorithms is inaccurate (e.g., UE 102 signals its actual location to v-u-CM 110 more than a threshold number of times), a different more prediction algorithm or another location estimation scheme (e.g., based on channel measurements) may be selected.

v-u-CM 110 may signal UE 102 and/or any applicable network nodes 104' with the selected location estimation scheme. v-u-CM 110 may also configure and signal other relevant parameters of the selected location estimation scheme to UE 102 and/or applicable network nodes 104'. For example, schemes based on downlink channel strength measurements, v-u-CM 110 may configure UE 102 with frequency for downlink signal strength reports, contents of downlink signal strength reports, and the like. As another example, for schemes based on uplink channel strength measurements, v-u-CM 110 may configure UE 102 and applicable network nodes 104' with transmission intervals for uplink pilot transmissions, transmission parameters (e.g., power level, resources used, and the like), the set of network nodes 104' that monitor UE 102's uplink transmissions, and the like. As yet another example, for schemes based on synchronized prediction algorithms, v-u-CM 110 may configure UE 102 a selected prediction algorithm scheme, error reporting configurations (e.g., criteria/thresholds triggering an error report, resources used for the error report), and the like. v-u-CM 110 may select the applicable parameters for a selected location estimation scheme and configure UE 102 and applicable network nodes 104' with the selected parameters. Other considerations and/or parameters may also be used for configuring a location estimation scheme by v-u-CM 110.

As network configuration and/or UE 102's configuration changes, v-u-CM 110 may dynamically update the selected location estimation scheme accordingly. For example, if the neighborhood relations around UE 102 changes (e.g., if UE 102 moves to a more or less densely populated area of network 100), a different location estimation scheme may be selected according to the new neighborhood relations. As another example, if UE 102 changes mobility environments (e.g., UE 102 moves to a highway or local routes or vice versa), the location estimation scheme may be selected according the new mobility environment. Thus, location estimation for UE 102 may be dynamically selected and updated based on network configuration and/or UE configuration. Furthermore, v-u-CM 110 can select a single location estimation scheme or v-u-CM 110 may select a combination of different location estimation schemes (e.g., a location estimation scheme based on both downlink and uplink channel measurements).

Using the configured location estimation scheme, v-u-CM 110 may track the served UE 102's location and provide location information to the network control plane. For example v-u-CM 110 may inform SDRAN-TE controller 122 of UE 102's location. SDRAN-TE controller 122 may dynamically configure forwarding paths for the UE 102 based on this location information, for example, by configuring entries of a forwarding information base at a corresponding v-u-SGW 108 and involved nodes in the local network domain of UE 102. SDRAN-TE controller 122 may configure a virtual network for UE 102 both in core network domain 101 and/or local network domain 103. v-u-CM 110 may also track UE 102's mobility patterns/mobility environment, for example, by tracking changes in UE 102's location over time. Updated mobility pattern information may be provided to the network control plane (e.g., SDT controller 120) and/or higher-level CMs (e.g., regional CM 116 or national CM 118).

Furthermore, v-u-CM 110 may update UE location at higher-tiered CMs (e.g., regional CMs 116 and/or national CM 118). The distribution of regional CMs 116 and/or national CM 118 may be geographically based, with each regional CM 116 controlling a certain region (e.g., a particular geographical region 104). Each regional CM 116 may track the location of various v-u-CMs 110 and v-u-SGWs 108 within its region. Regional CMs 116 may further track which UEs or group of UEs are served by a particular v-u-CM 110/v-u-SGW 108. National CM 118 may control regional CMs 116. Furthermore, national CM 118 may track the location of regional CMs 116, the location of any network SGWs 106 as applicable, as well as the location of various UEs on a regional level.

Figure 1B:
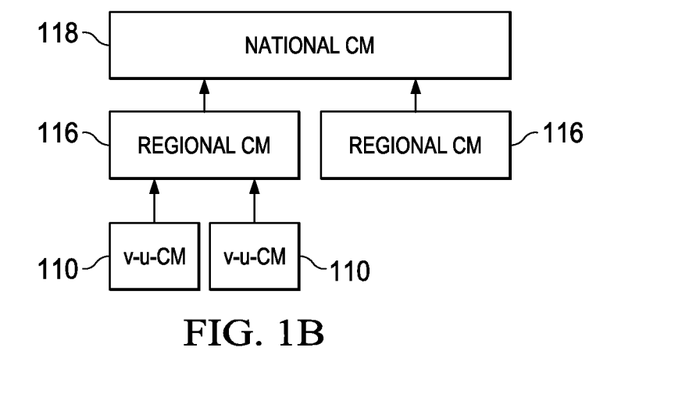

FIG. 1B illustrates a block diagram of this hierarchy. Each regional CM 116 may manage UE 102 registration prior to the creation of v-u-CM 110. Regional CMs 116 may authenticate UE registration, track UE movement, and/or trigger data plane reconfiguration based on UE 102's registration/movement. For example, in some embodiments, at UE registration, regional CM 116 may signal UE 102's information (e.g., location, UE ID, and the like) to SDT controller 120. SDT controller 120 may manage v-u-CM 110/v-u-SGW 108 creation, configuration, and/or location selection based on UE 102's configuration (e.g., neighborhood relations, QoE requirements, mobility patterns, and the like). For example, SDT controller 120 may configure a physical location of v-u-CM 110/v-u-SGW 108 based at least partially on UE 102's location. As UE 102's location changes, regional CM 116 may signal these changes to SDT controller 120, and SDT controller 120 may update the physical location of v-u-CM 110/v-u-SGW 108 accordingly.

SDT controller 120 may also configure the functionality (e.g., layer 3 through layer 1 functionality) provided by v-u-SGW 108 based on UE configuration (e.g., QoE requirements, QoS requirements, and the like) and/or network configuration (e.g., network topology, network transmission schemes, network architecture, and the like). The functionality of all v-u-SGWs 108 in network 100 may vary. Furthermore, the location of v-u-SGW 108 may be tracked by regional CM 116 and/or SDT controller 120.

National CM 118 may provide hierarchical control of regional CMs 116. For example, national CM 118 may track UE location at a regional level by tracking which UEs 102 are in particular regions of network 100. National CM 118 may also track default and/or configured SGWs (e.g., v-u-SGWs 108 or network SGWs 106) for UEs 102. Furthermore, when UE 102 moves into a new region, national CM 118 may help transfer the physical location of v-u-SGW 108/v-u-CM 110 to the new region.

The operators of each tier of CMs (e.g., regional, national, and the like) may be the same, different at different tiers of CM, or different within a same tier of CM. For example, operators of CMs may be physical network operators, virtual network operators, service customers, or the like. Physical network operators may include operators that physically set up and manage network nodes in a network. Virtual network operators may include operators that purchase virtual network resources from a physical network operator and provides the resources to an end user (e.g., a service customer). Service customers may include application providers, utility companies, customer managers, or the like. These various operators may all track UE location either directly (e.g., by operating one or more CMs) or indirectly (e.g., by receiving location information from another operator's CM).

The functionalities described above for v-u-CM 110 and v-u-SGW 108 may be performed when UEs 102 are in an active mode or an energy saving mode. In an energy saving mode, the logical data plane topology may be defined but dedicated physical resources may not be allocated for some segments of the network topology. For example, when UE 102 is in an energy saving mode, SDRAN-TE manager 122 may not allocate any dedicated resources for UE 102. In an energy saving, network 100 may not include any virtual networks for UE 102 or the virtual network allocation for UE 102 may be incomplete (e.g., dedicated resources may be allocated in core network domain 101 but not local network domain 103). Various network entities in network 110 may adapt to the energy saving mode for downlink/uplink communications.

For example, during downlink, a SGW (e.g., a network SGW 106 or v-u-SGW 108) that receives a packet may trigger virtual network configuration (e.g., resource allocation in core network domain 101 and/or local network domain 103) by signaling the network control plane (e.g., SDT controller 120). The allocation of additional dedicated resources may only be triggered, for example, when network traffic exceeds a particular threshold (e.g., a video transmission may trigger resource dedication while small packet transmissions may not). SDT controller 120 may check regional CM 116/national CM 118 for location information of network topology nodes (e.g., the ID of network SGW 106 and/or v-u-SGW 108) which can perform data forwarding for the UE. SDRAN-TE controller 120 then configures the virtual network link. In uplink communications, v-u-SGW 108 may trigger virtual network link generation. v-u-CM 110 or v-u-SGW 108 may also trigger paging of UE 102 in energy saving mode to determine UE 102's location.

Although a particular configuration of network 100 is illustrated in FIGS. 1A and 1B, various other embodiments may include other configurations of network 100. For example, network 100 may include multiple SDT controllers 120 and regional/national SDT controllers for managing local SDT controllers 120. As another example, SDT controller 120 may be a same entity as another network controller. For example, regional CM 116 may perform the functions of SDT controller 120 internally. Furthermore, while FIG. 1 illustrates regional CMs 116 and a national CM 118, other hierarchical configurations of CMs may also be used depending on network configuration.

Figure 2:
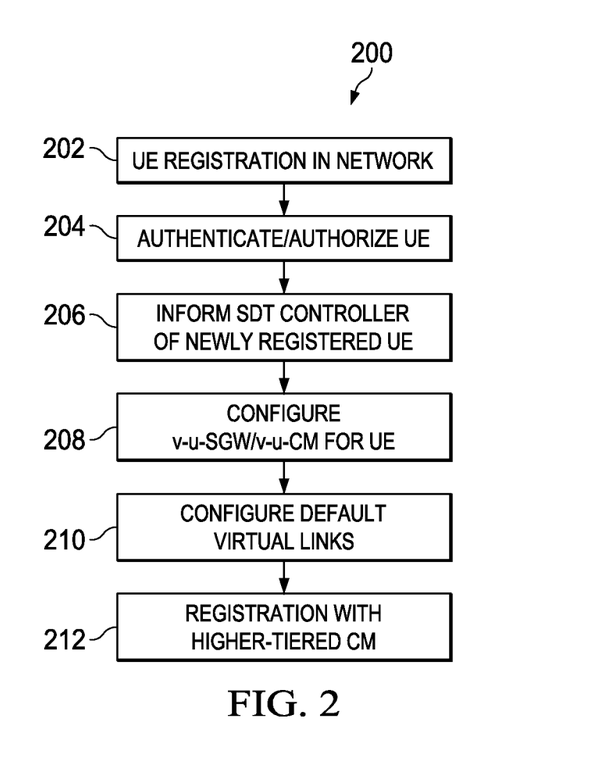
FIG. 2 illustrates a process flow of UE registration and virtual user-specific service gateway/connectivity manager creation in accordance with various embodiments.

FIG. 2 illustrates a process flow 200 of v-u-SGW 108/v-u-CM 110 creation based on UE 102 registration in accordance with various embodiments. Generally, regional CMs 116 may manage any unregistered UEs in network 100. In step 202, UE 102 interacts with regional CM 110 to register with the network. In step 204, a regional CM 116 (selected, e.g., based on geography) may authenticate the registration and authorize connectivity with UE 102 in the network. The authentication/authorization process may be performed by regional CM 116 in conjunction with a network service provider. For example, regional CM 116 may verify information provided during registration with the service provider. After successful authorization/authentication, regional CM 116 may inform the network control plane, for example, SDT controller 120 of the newly registered UE 102.

SDT controller 120 may then configure v-u-SGW 108/v-u-CM 110 in network 100. In various embodiments, SDT controller 120 may select a physical location for v-u-SGW 108/v-u-CM 110 based on neighborhood relations (e.g., location, configuration of geographical region 104, and the like), mobility patterns, QoE requirements, and the like of UE 102. For example, for relatively stationary or slow moving UEs the physical location of v-u-SGW 108/v-u-CM 110 may be located closer to a network edge (i.e., relatively close to UE 102) so that virtual network links between v-u-SGW 108 and UEs 102 are relatively short. In contrast, for fast moving UEs (as indicated by arrows 114), the physical location of v-u-SGW 108/v-u-CM 110 may be more centrally located in the network. As fast moving UEs 102 move in network 100, the location of v-u-SGW 108 may not require frequent updates due to its central location. Thus, v-u-SGWs 108 act as anchor points that enable simpler resource management. For example, UE mobility may not trigger complete reconfiguration of forwarding paths in network 100 because forwarding segments between network SGW 106 and v-u-SGW 108 may remain relatively constant.

In step 208, SDT controller 120 may further configure the functionality (e.g., layer 1 through layer 3 functionality) of v-u-SGW 108 in accordance with UE configuration (e.g., QoE requirements, QoS requirements, and the like) and/or network configurations (e.g., network topology, network transmission schemes, and the like). SDT controller 120 may also configure v-u-CM 110, for example, with information regarding available location estimation schemes, available prediction algorithms, network topology, UE capabilities, and the like. Next, in step 210, SDT controller 120 may optionally configure a default virtual network (e.g., backhaul links and access links) for UE 102. This default virtual network may be the forwarding paths used in the absence of forwarding path configurations from the network control plane (e.g., by SDRAN-TE controller 122). In step 212, regional CM 116 may register UE 102, v-u-SGW 108, and v-u-CM 110 with higher-tiered CMs, such as national CM 118, if applicable.

Figure 3A:
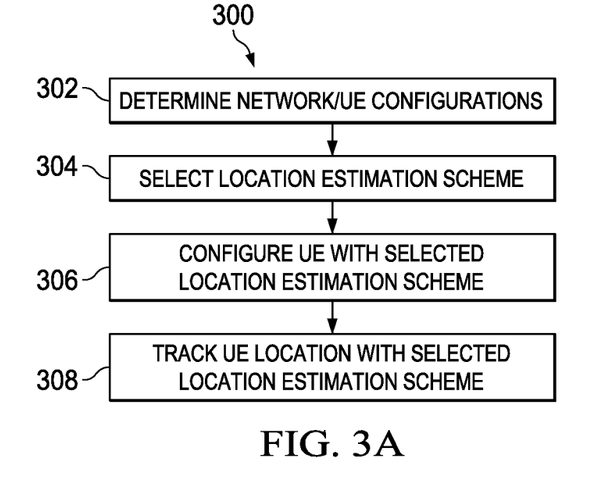
FIGS. 3A and 3C illustrate process flows of network operations using virtual user-specific service gateways/connectivity managers in accordance with various embodiments.

FIG. 3A illustrates a process flow 300 of location estimation scheme configuration in accordance in various embodiments. In step 302, a v-u-CM 110 may determine network configuration and/or UE configuration information. This information may be provided to v-u-CM 110 by the network control plane (e.g., SDT manager 120), higher-level CMs (e.g., regional or nation CM 116/118), and/or other network entities (including the UE). For example, relevant network and UE configuration information may include network topology, energy saving considerations for network nodes, neighborhood relations, UE capabilities, UE mobility setting/environment, and the like.

In step 304, v-u-CM 110 selects a location estimation scheme based on the network configuration/UE configuration information. Available location estimation schemes may include estimating UE location based on downlink channel measurements, uplink channel measurements, a synchronized location prediction algorithms, and the like. In step 306, v-u-CM 110 may configure UE 102 with the selected location estimation scheme. For example, v-u-CM 110 may inform UE 102 with the selected location estimation scheme and any applicable information (e.g., a selected location prediction algorithm). v-u-CM 110 may also configure/trigger configuration of nearby network entities, such as network nodes 104', with the selected location estimation scheme. For example, v-u-CM 110 may trigger network nodes 104' to measure uplink channel quality (e.g., using a pilot signal broadcasted by UE 102) and predict UE 102's location based on the measured channel quality. Furthermore, v-u-CM 110 may configure various parameters of the selected location estimation scheme for the UE any other applicable network entities. Finally, in step 308 v-u-CM 110 may track UE location using the selected location estimation scheme. If network configuration/UE configuration changes, the location estimation scheme may be updated by v-u-CM 110 accordingly.

Figure 3B:
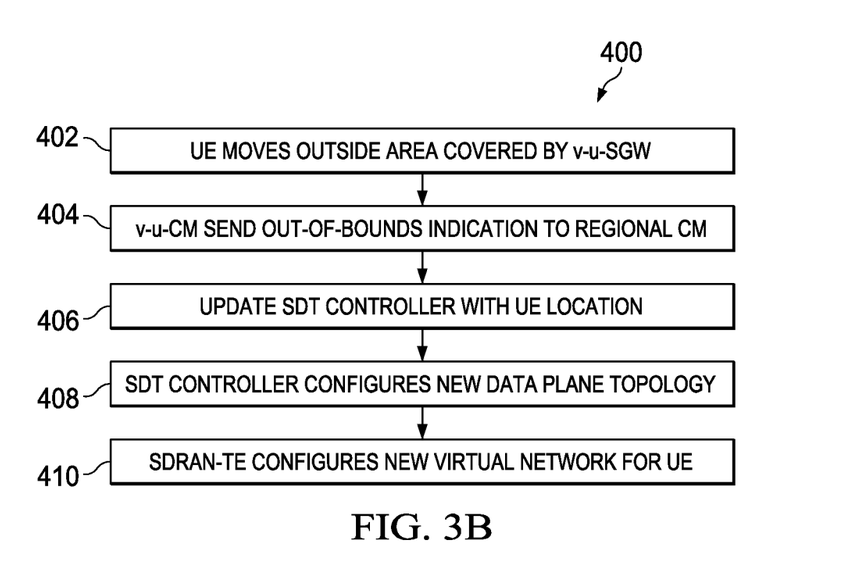

FIG. 3B illustrates a process flow 400 of user connectivity management within a region. For example, process flow 400 may occur while UE 102 moves within a region of network 100 controlled by a regional CM 116. In step 402, UE 102 may move outside of an area covered by its serving v-u-SGW 108. The geographic area covered by a serving v-u-SGW 108 may be configured by SDT controller 120. In step 404, v-u-CM 110 detects UE 102's new location outside of the area covered by v-u-SGW 108. v-u-CM 110 may detect UE 102's location using a configured UE-specific location estimation scheme. v-u-CM 110 may transmit an out-of-bounds indication to regional CM 116.

In step 406, regional CM 116 updates SDT controller 120 with UE 102's location. In step 408, SDT controller 120 configures a new data plane topology based on UE 102's new neighborhood relations (e.g., new location). For example, SDT controller 120 may select a new location for v-u-SGW 108/v-u-CM 110 based on UE 102's neighborhood relations, mobility patterns (e.g., fast moving or slow moving), QoE requirements, and the like. In step 310, SDRAN-TE controller 122 may configure a new virtual network for UE 102. The new virtual network may account for the new location of v-u-SGW 108. For example, SDRAN-TE controller 122 may reconfigure transmission paths in core network domain 101 and/or local network domain 103 based on UE 102's new location.

Figure 3C:
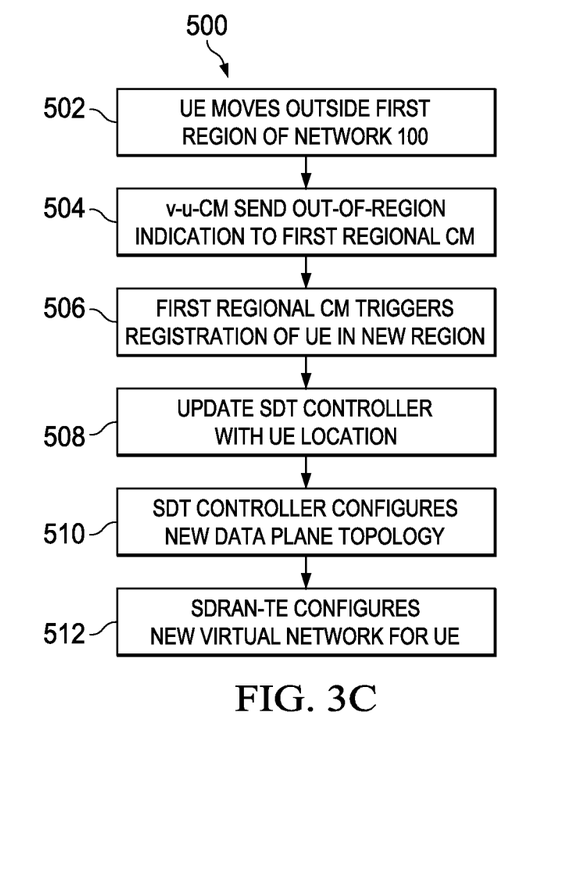

FIG. 3C illustrates a process flow 500 of user connectivity management when UE 102 moves from one region to another. For example, process flow 500 may occur when UE 102 moves from a first region (controlled by a first regional CM 116) to a second region (controlled by a second regional CM 116) in network 100. In step 502, UE 102 may move outside of an area covered by its serving v-u-SGW 108 and also move from a first region (e.g., controlled by a first regional CM 116) to a second region (e.g., controlled by a second regional CM 116). In step 504, v-u-CM 110 detects UE 102's new location in the second region. v-u-CM 110 may detect UE 102's location using a configured UE-specific location estimation scheme. v-u-CM 110 may transmit an out-of-region indication to first regional CM 116.

In step 506, the first regional CM 116 triggers registration of UE 102 in the second region. The first regional CM 116 may trigger this registration, for example, by signaling the second regional CM 116 directly. Alternatively, the first regional CM 116 may signal UE 102's new location to national CM 118, and national CM 118 may signal the second regional CM 116 to register UE 102. In step 508, the second regional CM 116 updates a SDT controller 120 with UE 102's new location. The SDT controller 120 may be the same SDT controller that controls the first region or a different SDT controller 120. In step 510, SDT controller 120 configures a new data plane topology based on UE 102's new neighborhood relations (e.g., new location) in the second region. For example, SDT controller 120 may select a new location for v-u-SGW 108/v-u-CM 110 in the second region based on UE 102's neighborhood relations, mobility patterns (e.g., fast moving or slow moving), QoE requirements, and the like. SDT controller 120 may relocate v-u-SGW 108/v-u-CM 110 to the new location in the second region. In step 512, SDRAN-TE controller 122 may configure a new virtual network for UE 102. The new virtual network may account for the new location of v-u-SGW 108. For example, SDRAN-TE controller 122 may reconfigure transmission paths in both core network domain 101 and local network domain 103 based on UE 102's new location.

Figure 4A:
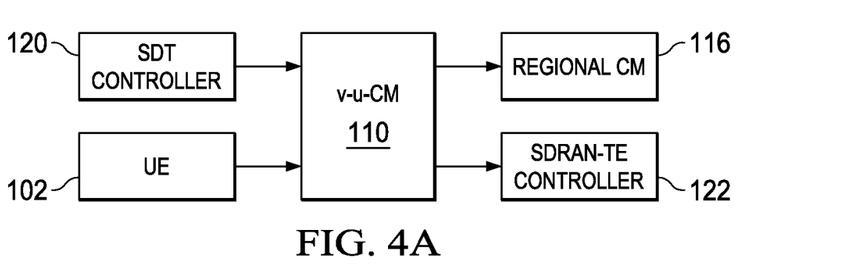
FIGS. 4A and 4B illustrate block diagrams of virtual user-specific connectivity managers and regional connectivity in accordance with various embodiments.

FIG. 4A illustrates a block diagram of a v-u-CM 110 interacting with various network entities in network 100 in accordance with various embodiments. A SDT controller 120 manages the creation/deletion of v-u-CM 110 based on UE 102 status (e.g., registration/de-registration). SDT controller 120 may also signal network configuration and/or UE configuration information to v-u-CM 110. For example, SDT controller 120 may inform v-u-CM 110 of network topology, the coverage area of a corresponding v-u-SGW 108, boundaries of the region controlled by regional CM 116, UE mobility patterns, and the like. UE 102 (or a radio node associated with UE 102) may provide v-u-CM 110 information for determining its location. In an embodiment, v-u-CM 110 may configure UE 102 with a UE-specific location estimation scheme. For example, location estimation schemes may be based on downlink channel measurements, uplink channel measurements, or synchronized prediction algorithms performed by both v-u-CM 110 and UE 102. When a synchronized prediction algorithm is used to track UE 102's location, UE 102 may signal v-u-CM 110 when it detects a difference between its predicted location and its actual location (e.g., based on GPS data).

v-u-CM 110 may register with regional CM 116 and signal UE location information to regional CM 116. Furthermore, when UE 102 moves outside of an area covered by the serving v-u-SGW 108, v-u-CM 110 may send an out-of-bounds indication to regional CM 116. The out-of-bounds indication may trigger regional CM 116 and SDT controller 120 to relocate v-u-SGW 108/v-u-CM 110 based on the UE's new location. v-u-CM 110 may also trigger the configuration of a virtual network (e.g., core network domain 101 and/or local network domain 103) by signaling UE 102's location to the network control plane (e.g., SDRAN-TE controller 122). v-u-CM 110 may also interface with other network entities in the network 100's control and/or data plane.

Figure 4B:
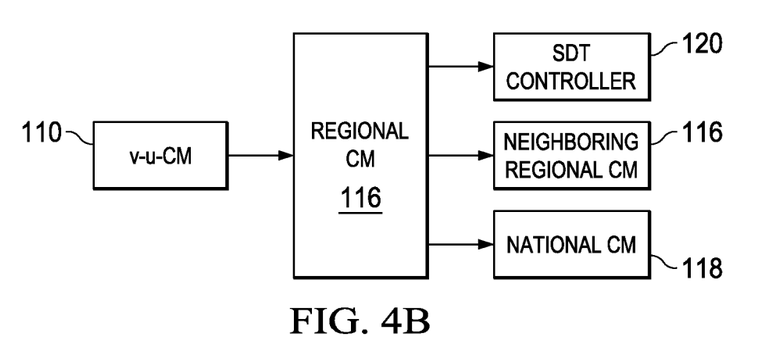

FIG. 4B illustrates a block diagram of a regional CM 116 interacting with various network entities in network 100 in accordance with various embodiments. Regional CM 116 receives location and registration information (e.g., UE ID) of UE 102 from a serving v-u-CM 110. When the UE moves outside a region covered by a v-u-SGW 108 or regional CM 116, regional CM 116 may receive a corresponding out-of-bounds or out-of-region indication from v-u-CM 110. Based on received information, regional CM may trigger SDT controller 120 to relocate v-u-CM 110 (and a corresponding v-u-SGW 108) to a new location. If UE 102 has moved into a new region (e.g., when regional CM 116 receives an out-of-region indication), regional CM 116 may trigger the registration and relocation of UE 102 and v-u-SGW 108/v-u-CM 110 in the new region. For example, regional CM 116 may send UE information (e.g., location information, UE ID, and the like) to a neighboring regional CM 116 and/or a national CM 118.

Figure 5:
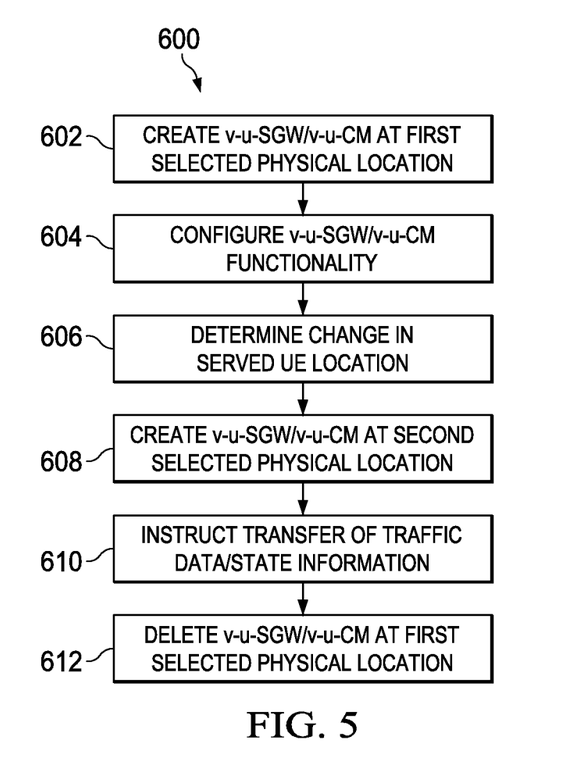
FIG. 5 illustrates a process flow of software defined topology controller operations in accordance with various embodiments.

FIG. 5 illustrates a process flow 600 for network controller operations in accordance with various embodiments. In step 602, a SDT controller 120 or similar network device creates a v-u-SGW 108/v-u-CM 110 at a first selected physical location (e.g., a radio node or the like), for example, based on a UE 102's registration in the network. The first physical location of v-u-SGW 108/v-u-CM 110 may be selected based on UE 102's neighborhood relations, mobility, QoE requirements, and/or the like. For example, for a relatively stationary/slow moving UE 102, SDT controller 120 may locate v-u-SGW 108/v-u-CM 110 at a network edge location (e.g., close to UE 102). As another example, for a relatively fast moving UE 102, SDT controller may choose a more central network location for v-u-SGW 10/v-u-CM 110. Next in step 504, SDT controller 120 may configure the functionality (e.g., layer 3, layer 2, and/or layer 1 functionality) provided by v-u-SGW 108. The configured functionality may be based on UE configuration (e.g., QoE requirements, QoS requirements, and the like) and/or network configuration (e.g., network topology, network architecture, network transmission scheme, and the like).

In step 606, SDT controller 120 determines a change in UE location/mobility/QoE/or the like. For example, SDT controller 120 may receive an update on UE 102's location/mobility from a connectivity manager (e.g., regional CM 116) that monitors UE 102's location or the like. Based on this change, SDT controller 120 may decide to move v-u-SGW 108/v-u-CM 110 accordingly. For example, SDT controller 120 may determine a second physical location for v-u-SGW 108/v-u-CM 110.

In step 608, SDT controller 120 creates a new v-u-SGW 108/v-u-CM 110 for UE 102 in the selected second physical location. In step 610, SDT controller 120 instructs the v-u-SGW 108/v-u-CM 110 at the first physical location to transfer any traffic data, UE 102 state information, and the like to the new location. Transfer of UE 102's state information may allow for seamless transition of v-u-SGW 108/v-u-CM 110 during changes in physical location. Next, in step 612, SDT controller 120 may delete the v-u-SGW 108/v-u-CM 110 at the first physical location. Thus, the location of the v-u-SGW/v-u-CM associated with the UE 102 is moved to a second physical location based on a change in UE 102's location, mobility, or the like. SDT controller 120 may also remove v-u-SGW 108/v-u-CM 110 completely when UE 102 powers off/deregisters from the network. SDT controller 120 may be notified of this, for example, by regional CM 116.

Figure 6:
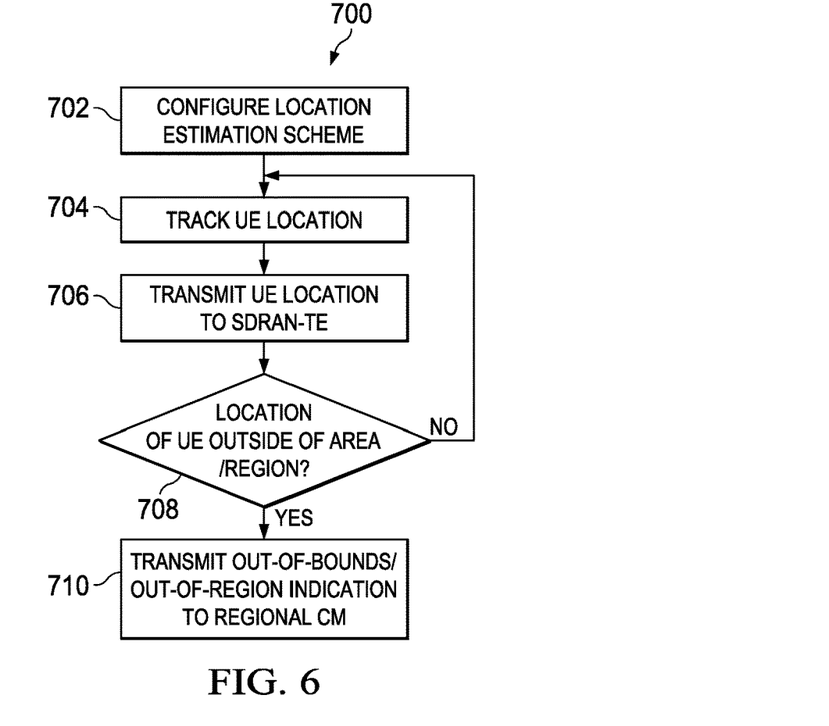
FIG. 6 illustrates a process flow of software defined virtual user specific connectivity manager operations in accordance with various embodiments.

FIG. 6 is a process flow 700 of v-u-CM operations in accordance with various embodiments. In step 702, v-u-CM 110 may configure a location estimation scheme (e.g., based on downlink channel measurements, uplink channel measurements, or synchronized location prediction) for a UE 102 served by the v-u-CM 110. The configured location estimation scheme may be selected based on network configuration and/or UE configuration, and the location estimation scheme may be dynamically updated based on changes in network/UE configuration. In step 704, v-u-CM tracks the location of UE 102 using the configured location estimation scheme. In step 706, v-u-CM 110 may transmit UE 102's location to a SDRAN-TE controller 122 for configuration of virtual network links (e.g., various forwarding segments). In step 708, v-u-CM 110 determines if the location of UE 102 is outside of an area covered by v-u-SGW 108 and/or a region controlled by a regional CM 116. If not, v-u-CM 110 continues to track UE 102's location and signal the location to SDRAN-TE controller 122. If the location of the UE is outside the area/region covered by v-u-SGW 108/regional CM 116, v-u-CM 110 may, in step 710, signal an out-of-bounds or out-of-region indication to the regional CM 116. These indications may trigger the relocation of v-u-CM 110 (and a corresponding v-u-SGW 108) to a new physical location based on the new location of the UE, UE mobility, and the like. SDT controller 120 may configure v-u-CM 110 with information regarding the coverage area of v-u-SGW 108 and/or regional CM 116.

Figure 7:
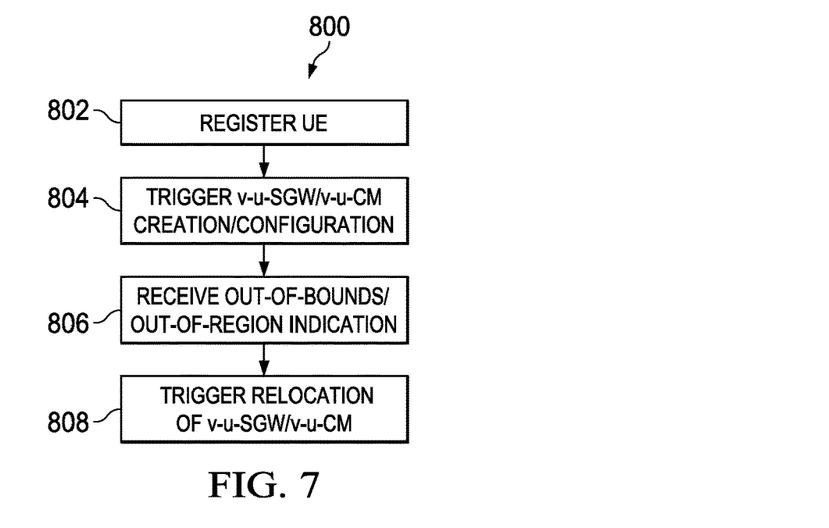
FIG. 7 illustrates a process flow of regional connectivity manager operations in accordance with various embodiments.

FIG. 7 illustrates a process flow 800 of regional CM operations in accordance with various embodiments. In step 802, the regional CM 116 registers a UE 102 in network 100. Based on UE 102's registration, in step 804, regional CM 116 may trigger the creation of a v-u-SGW 108/v-u-CM 110 for the newly registered UE 102. Next, in step 806, regional CM 110 may receive an out-of-bounds/out-of-region indication from the v-u-CM 110 serving the UE 102. In step 808, regional CM 116 may trigger the relocation of the v-u-SGW 108/v-u-CM 110 based on the new location of regional CM 110. For example, if an out-of-bounds indication is received, regional CM 116 may signal SDT controller 120 to relocate the v-u-SGW 108/v-u-CM 110 to a new location within the region. If an out-of-region indication is received, in addition to signaling SDT controller 120, regional CM 116 may also trigger registration (e.g., by sending UE ID, UE location, and the like) of UE 102 in the new region. Regional CM 116 may trigger this registration with a national CM 118 and/or a regional CM 116 controlling the new region. Furthermore, at any point if regional CM 116 detects UE 102 has powered off/deregistered from the network, the regional CM 116 may trigger the deletion of the corresponding v-u-SGW 108/v-u-CM 110.

Thus, network 100 may include v-u-CMs 110 for UEs 102, which configure location estimation schemes for a served UE, track UE location, and signal this information to various controllers in the network. As UEs 102 move in the network, v-u-CM 110 may trigger the relocation of a corresponding v-u-SGW 108. v-u-CMs 110 may also trigger the configuration of virtual network links, for example, by a SDRAN-TE controller 122. Thus, data plane topology configuration is dynamically configurable based on UE location, which may be tracked by a v-u-CM dedicated to the UE.

Figure 8:
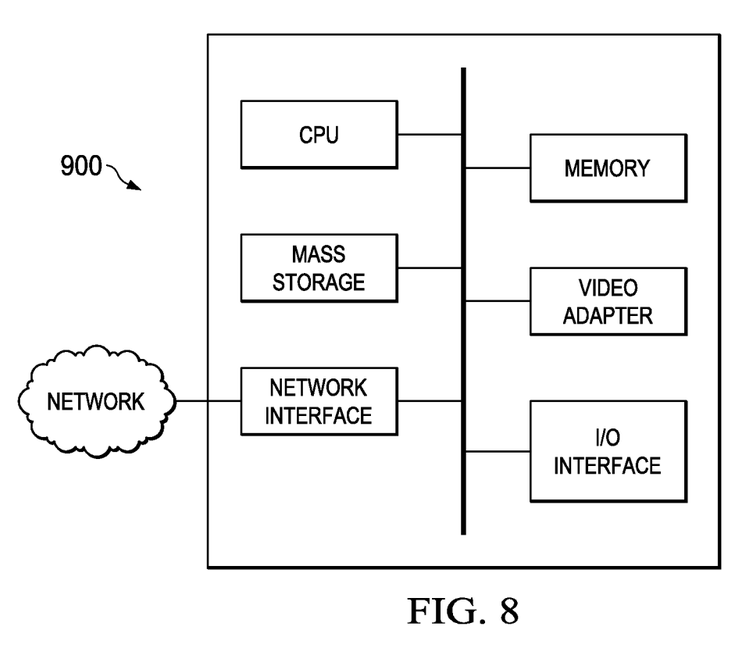
FIG. 8 illustrates a computing platform that may be used for implementing, for example, the devices and methods described herein, in accordance with an embodiment.

FIG. 8 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. External input and out devices may be coupled to the processing unit, and any number of interface cards may be utilized. For example, a serial interface such as Universal Serial Bus (USB) (not shown) may be used to provide an interface for external input and output devices.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating in a network comprising:
 selecting, by a virtual user-specific connectivity manager (v-u-CM) on a processor, a location estimation method from a plurality of location estimation methods for a user equipment (UE) in accordance with UE configuration, wherein the v-u-CM is associated with the UE and is created upon registration of the UE in the network, wherein the UE configuration used for selecting the location estimation method comprises at least one of UE energy saving considerations, UE mobility patterns, UE capability, quality of experience requirements of the UE, or neighborhood relations of the UE;
 configuring, by the v-u-CM, the location estimation method for the UE; and
 tracking, by the v-u-CM, a location of the UE in the network in accordance with the location estimation method.

2. The method of claim 1, further comprising transmitting an out-of-bounds indication to a regional connectivity manager (CM) when the location of the UE is outside an area covered by a virtual user-specific service gateway (v-u-SGW) serving the UE.

3. The method of claim 2, further comprising transmitting an out-of-region indication to the regional CM when the location of the UE is outside a region controlled by the regional CM.

4. The method of claim 2, wherein a national CM records at least one of the regional CM and the v-u-SGW serving the UE.

5. The method of claim 1 further comprising transmitting the location of the UE to a software defined radio access network traffic engineering (SDRAN-TE) controller.

6. The method of claim 1, wherein configuring the location estimation method is further in accordance with network configuration, network topology, or a combination thereof.

7. The method of claim 1, wherein UE configuration comprises UE energy saving considerations, UE mobility patterns, UE capability, quality of experience requirements of the UE, and neighborhood relations of the UE.

8. The method of claim 1, wherein the location estimation method is in accordance with downlink channel measurements of the UE.

9. The method of claim 1, wherein the location estimation method is in accordance with uplink channel measurements of the UE.

10. The method of claim 1, wherein the location estimation method is in accordance with a synchronized prediction algorithm.

11. The method of claim 1, wherein configuring the location estimation method for a UE comprises signaling, to the UE, one or more parameters of the location estimation method.

12. The method of claim 11, wherein the one or more parameters of the location estimation method comprise a frequency of downlink signal strength reports, parameters of the downlink signal strength reports, frequency of uplink reference signal transmissions, parameters of the uplink reference signal transmissions, a set of network nodes for monitoring the uplink reference signal transmissions, a selected prediction algorithm, synchronized prediction error reporting parameters, or a combination thereof.

13. The method of claim 1, wherein the v-u-CM tracks the location of the UE by predicting the location of the UE based on previous, known locations of the UE without relying on channel measurements.

14. The method of claim 1, wherein the v-u-CM is one of a plurality of v-u-CMs, the UE is one of a plurality of UEs, and each one of the plurality of v-u-CMs is associated with only one of the plurality of UEs.

15. A method for communicating in a network comprising:
configuring, by a virtual user-specific connectivity manager (v-u-CM) on a processor, a location estimation scheme for a user equipment (UE) in accordance with UE configuration, wherein the v-u-CM is created in accordance with registration of the UE in the network; and
tracking a location of the UE in accordance with the location estimation scheme, wherein tracking the location of the UE comprises predicting, by the v-u-CM, the location of the UE in accordance with a synchronized prediction algorithm, and receiving an actual location of the UE when a predicted location of the UE and the actual location of the UE differs more than a threshold.

16. The method of claim 15, further comprising transmitting an out-of-bounds indication to a regional connectivity manager (CM) when the location of the UE is outside an area covered by a virtual user-specific service gateway (v-u-SGW) serving the UE.

17. The method of claim 16, further comprising transmitting an out-of-region indication to the regional CM when the location of the UE is outside a region controlled by the regional CM.

18. The method of claim 15 further comprising transmitting the location of the UE to a software defined radio access network traffic engineering (SDRAN-TE) controller.

19. The method of claim 15, wherein configuring the location estimation scheme is further in accordance with network configuration, network topology, or a combination thereof.

20. The method of claim 15, wherein UE configuration comprises UE energy saving considerations, UE mobility patterns, UE capability, quality of experience requirements of the UE, neighborhood relations of the UE, or a combination thereof.

21. The method of claim 15, wherein configuring the location estimation scheme for a UE comprises signaling, to the UE, one or more parameters of the location estimation scheme.

22. A network entity comprising:
a processor; and
a computer readable storage medium storing programming for execution by the processor, the programming including instructions to:
create and associate a virtual user-specific connectivity manager (v-u-CM) with a user equipment (UE) upon registration of the UE in a network; and
operate the v-u-CM, wherein the instructions to operate the v-u-CM include instructions to:
select a location estimation method from a plurality of location estimation methods for the UE in accordance with UE configuration,
configure the location estimation method for the UE, and
track a location of the UE in the network in accordance with the location estimation method, wherein the UE configuration used for selecting the location estimation method comprises at least one of UE energy saving considerations, UE mobility patterns, UE capability, quality of experience requirements of the UE, or neighborhood relations of the UE.

23. The network entity of claim 22, wherein the instructions to operate the v-u-CM include further instructions to transmit an out-of-bounds indication to a regional connectivity manager (CM) when the location of the UE is outside an area covered by a virtual user-specific service gateway (v-u-SGW) serving the UE.

24. The network entity of claim 23, wherein the instructions to operate the v-u-CM include further instructions to transmit an out-of-region indication to the regional CM when the location of the UE is outside a region controlled by the regional CM.

25. The network entity of claim 23, wherein a national CM records at least one of the regional CM and the v-u-SGW serving the UE.

26. The network entity of claim 22, wherein the location estimation method is in accordance with downlink channel measurements, uplink channel measurements, a synchronized prediction algorithm, or any other schemes, or combinations thereof.

27. The network entity of claim 22, wherein the location estimation method is configured in accordance with network configuration, and wherein the UE configuration comprises UE energy saving considerations, UE mobility patterns, UE capability, quality of experience requirements of the UE, and neighborhood relations of the UE.

28. The network entity of claim 22, wherein the v-u-CM tracks the location of the UE by predicting the location of the UE based on previous, known locations of the UE without relying on channel measurements.

29. A method for network connectivity manager (CM) operations comprising:
registering, by a first network CM, a UE in a network;
triggering creation of a virtual user-specific connectivity manager (v-u-CM) and a virtual user-specific service gateway (v-u-SGW) for the UE in accordance with registration of the UE, wherein the v-u-CM is configured to track a location of the UE;
receiving an out-of-region indication from the v-u-CM when the location of the UE is outside a first region controlled by the first network CM;
triggering registration of the UE in a second region controlled by a second network CM in accordance with the location of the UE; and
triggering a relocation of the v-u-CM and the v-u-SGW in the second region in accordance with the out-of-region indication.

30. The method of claim 29, wherein triggering the creation of the v-u-CM and the v-u-SGW comprises transmitting the location of the UE to a software defined topology (SDT) controller, wherein the SDT controller is configured to select a first physical location of the v-u- CM and the v-u-SGW in accordance with the location of the UE.

31. The method of claim 29, further comprising:
receiving an out-of-bounds indication from the v-u-CM when the location of the UE is outside an area covered by the v-u-SGW; and triggering a relocation of the v-u-CM and the v-u-SGW in accordance with the out-of-bounds indication.

32. The method of claim 31, wherein triggering the relocation of the v-u-CM and the v-u-SGW comprises transmitting the location of the UE to a software defined topology (SDT) controller, wherein the SDT controller is configured to select a second physical location of the v-u-CM and the v-u-SGW in accordance with the location of the UE.

33. The method of claim 31, wherein the relocation of the v-u-CM and the v-u-SGW comprises transferring traffic data and state information of the UE.

34. The method of claim 29, wherein triggering registration of the UE in the second region comprises transmitting the location of the UE to a higher-tiered CM or the second network CM, wherein the higher-tiered CM controls the first and second network CMs.

35. The method of claim 29, further comprising registering the UE with a higher-tiered CM, wherein the higher-tiered CM controls the first network CM.

36. The method of claim 35, wherein the higher-tiered CM tracks location information the UE on a regional level.

37. The method of claim 29, further comprising tracking, by the first network CM, physical location information for the v-u-SOW and the v-u-CM.

38. A first network connectivity manager (CM) comprising:
a processor; and
a computer readable storage medium storing programming for execution by the processor, the programming including instructions to:
register a UE in a network;
trigger creation of a virtual user-specific connectivity manager (v-u-CM) and a virtual user-specific service gateway (v-u-SGW) for the UE in accordance with registration of the UE, wherein the v-u-CM is configured to track a location of the UE;
receive an out-of-region indication from the v-u-CM when the location of the UE is outside a first region controlled by the first network CM;
trigger registration of the UE in a second region controlled by a second network CM in accordance with the location of the UE; and
trigger a relocation of the v-u-CM and the v-u-SGW in the second region in accordance with the out-of-region indication.

39. The first network CM of claim 38, wherein the programming includes further instructions to:
receive an out-of-bounds indication from the v-u-CM when the location of the UE is outside an area covered by the v-u-SGW; and
trigger a relocation of the v-u-CM and the v-u-SGW in accordance with the out-of-bounds indication.

\* \* \* \* \*

UNITED STATES PATENT AND TRADEMARK OFFICE
CERTIFICATE OF CORRECTION

PATENT NO. : 10,097,962 B2
APPLICATION NO. : 14/192573
DATED : October 9, 2018
INVENTOR(S) : Hang Zhang Page 1 of 1

It is certified that error appears in the above-identified patent and that said Letters Patent is hereby corrected as shown below:

In the Claims

In Column 17, Line 25, Claim 37, delete "v-u-SOW" and insert --v-u-SGW--.

Signed and Sealed this
Twenty-ninth Day of January, 2019

Andrei Iancu
*Director of the United States Patent and Trademark Office*